Aug. 13, 1968  G. M. BARNEY  3,397,397

TERRAIN-FOLLOWING RADAR

Filed Dec. 20, 1966  3 Sheets-Sheet 1

INVENTOR
GEORGE M. BARNEY

E. Mickey Hubbard
ATTORNEY

United States Patent Office 3,397,397
Patented Aug. 13, 1968

3,397,397
TERRAIN-FOLLOWING RADAR
George M. Barney, Dallas, Tex., assignor to Texas Instruments Incorporated, Dallas, Tex., a corporation of Delaware
Filed Dec. 20, 1966, Ser. No. 603,242
8 Claims. (Cl. 343—7)

ABSTRACT OF THE DISCLOSURE

An airborne, forward looking radar is disclosed which provides both elevation and azimuth scanning thereby allowing an aircraft to circumnavigate obstacles where possible in order to maintain the same low altitude, and rise over obstacles only when circumnavigation is not possible or when circumnavigation has exceeded predetermined limits from a desired course.

---

This invention relates generally to airborne radar, and more particularly to a radar system for developing information concerning both vertical clearance and clearance of obstacles or obstructions directly and to each side of the flight path of the aircraft so that obstacles in the flight path of the aircraft can be avoided by changing course where possible rather than increasing altitude.

In conventional terrain-following radar systems, the radar scans in a vertical plane above and below the flight path of the aircraft. The first return signal at any given scan angle is compared with a reference templet signal. If the return signal occurs prior to the templet signal, a climb command control signal is developed having a magnitude dependent upon the time difference between the first return signal and the templet signal. Thus, the magnitude of the climb command control signal is related to the abruptness of the climb maneuver which the aircraft must make in order to avoid the obstacle. If a return signal occurs after the templet signal and there is no return signal before the templet signal, then a dive command signal is generated having a magnitude that is a measure of how abruptly the aircraft should dive to maintain the desired ground clearance. Of course, the maximum values of either the climb or dive signals are limited to values appropriate for safe maneuvering of the particular aircraft.

In such a terrain-following system, the course of the aircraft is maintained constant. One of the primary purposes of terrain-following radar is to permit the aircraft to safely fly at high speeds in all types of weather at a minimum altitude so as to avoid detection by enemy radar. If the course of the aircraft happens to cross over a peak or other local obstruction, the aircraft will rise to an altitude which will increase the likelihood of at least momentary detection, when a relatively simple circumnavigation of the obstruction would have permitted the aircraft to remain at the same, relatively safe altitude. Further, in many instances an aircraft could follow valleys or other natural low lying areas and use the adjacent high terrain as a radar shield to reduce the likelihood of detection.

In accordance with the present invention, a radar system is provided which not only provides the customary elevation scanning to generate climb or dive commands for terrain following, but also provides azimuth scanning to generate steering commands for terrain avoidance. Thus, the aircraft may circumnavigate obstacles where possible in order to maintain the same low altitude, and rise over obstacles only when circumnavigation is not possible, or when circumnavigation has exceeded predetermined limits from a desired course.

Figure 1:
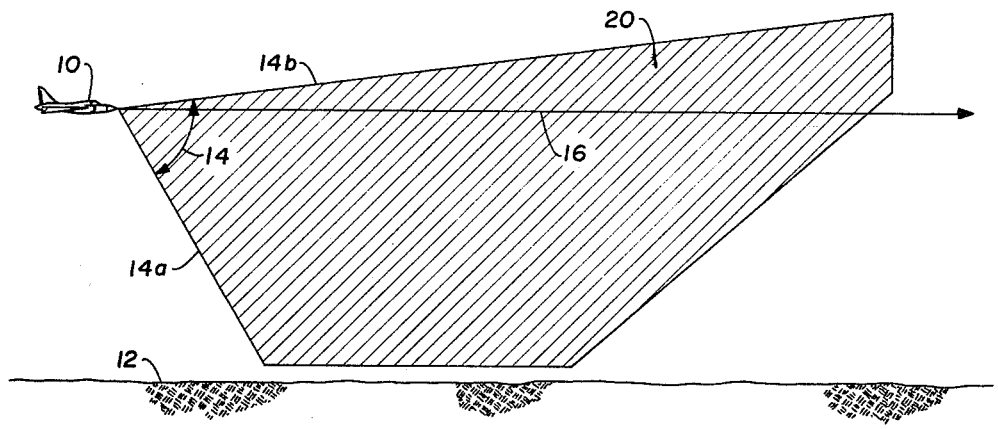
Figure 2:
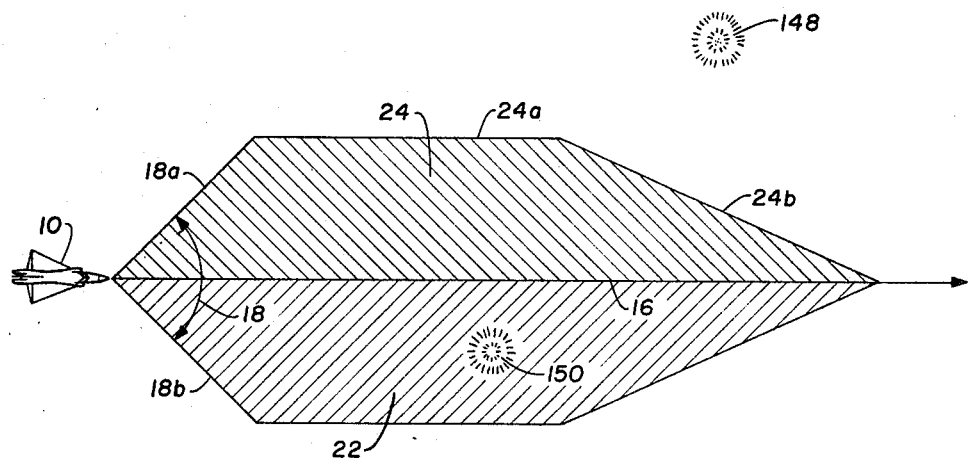
Figure 3:
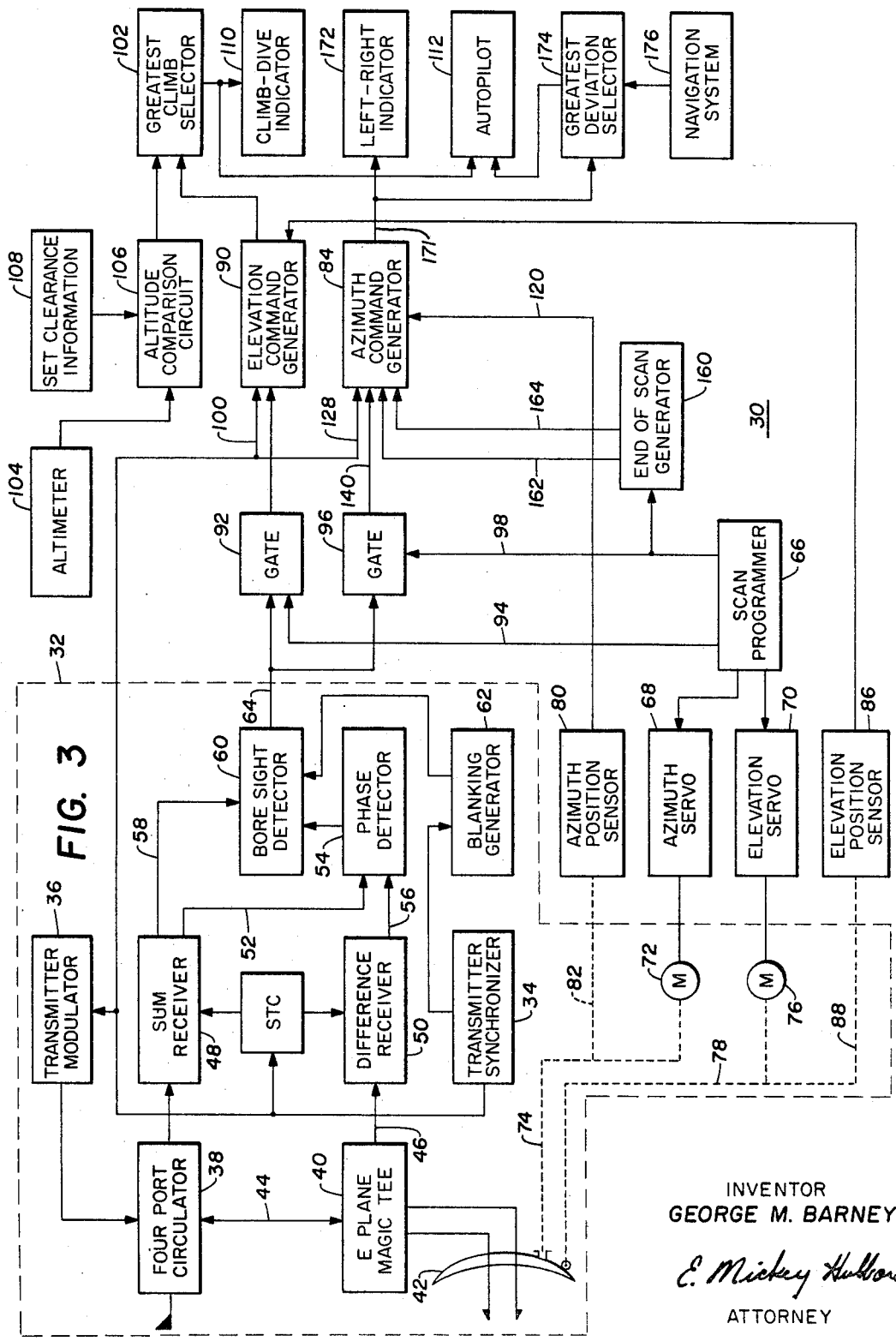
Figure 4:
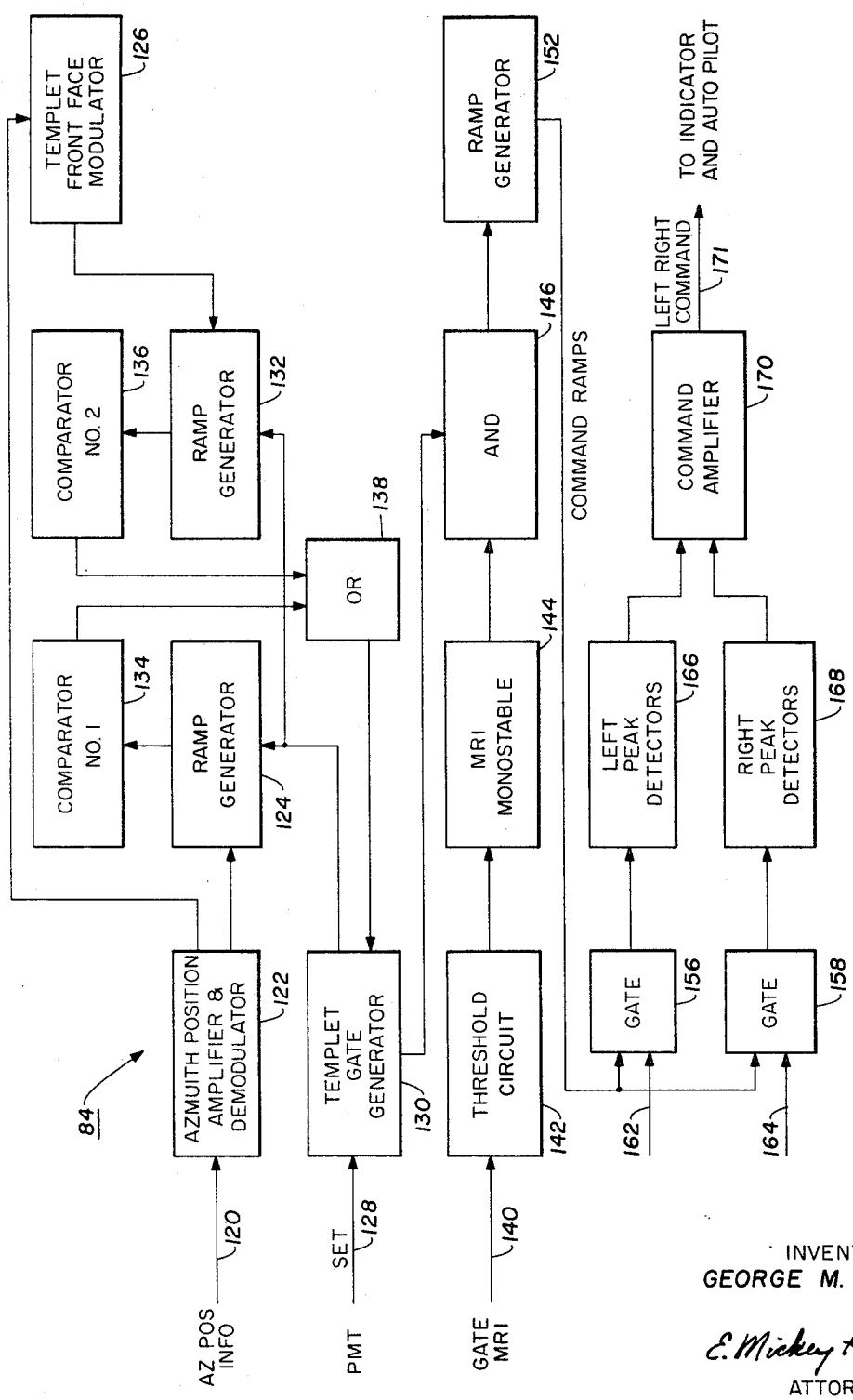

For a more complete understanding of the present invention and for further objects and advantages thereof, reference may now be had to the following description taken in conjunction with the accompanying drawings in which:

FIGURE 1 is an elevational view which illustrates the operation of the radar system of the present invention;
FIGURE 2 is a plan view of the aircraft of FIGURE 1 which illustrates the operation of the radar system of the present invention;
FIGURE 3 is a schematic block diagram of a radar system in accordance with the present invention; and
FIGURE 4 is a schematic block diagram of the azimuth command generator of the radar system of FIGURE 3.

Referring now to the drawings, and in particular to FIGURE 1, assume that an aircraft 10 is to be maintained at a preselected height above terrain 12. The aircraft 10 is provided with a radar system including an antenna for transmitting and receiving pulses of electromagnetic energy. The radar preferably used in this embodiment of the invention is of the monopulse type which has a relatively sharp beam. The beam may be steered, either by varying the geometrical relationships in the radar antenna, or by varying the phase in a phase array antenna, both of which are well known. In either case, as the bore sight of the radar unit is scanned in elevation and azimuth ahead of the aircraft, a video pulse representative of the first return echo is developed from the return signals. By way of example, the radar may transmit pulses of 16.5 gigahertz energy for a fraction of a microsecond at a repetition rate of four thousand pulses per second.

The monopulse beam thus produced is swept through a predetermined vertical scan angle 14 between a lower limit 14a and an upper limit 14b. The lower limit 14a is typically about 15° below the flight vector 16 of the aircraft and the upper limit 14b is typically about 10° above the flight vector. When the vertical scan has been completed, the monopulse beam is then swept through a horizontal scan angle 18, as shown in FIGURE 2, between a left azimuth limit 18a and a right azimuth limit 18b. The left azimuth limit 18a is typically 20° left of the flight vector 16, and the right azimuth limit 18b is typically 20° right of the flight vector 16. The antenna scan in both the vertical and horizontal directions is referenced or stabilized to the flight vector of the aircraft, with the flight vector 16 lying at the intersection of the planes of the two scans. The monopulse beam may move through a complete scan cycle in about one second. A preferred scan cycle includes movement of the beam from the upper limit 14b downwardly to the lower vertical limit 14a, then upwardly to the upper scan limit 14b. The beam then transcribes an arc as it moves from the upper limit 14b to the left azimuth scan limit 18a. From the left scan limit 18a, the beam scans horizontally to the right azimuth scan limit 18b, then returns to the upper limit 14b through an arcuate path. As a result, the antenna scans the vertical plane twice each second, and scans the horizontal plane once each second.

In the terrain-following and avoidance radar which will presently be described, the time occurrence of the first return of the radar beam is compared to the time occurrence of a templet pulse. From this comparison, command signals are generated to activate an autopilot in the aircraft, or provide a visual signal for the pilot so that the aircraft will be caused to fly right or left, dive or climb, or perform combinations of these maneuvers as the case may require in order for the aircraft to be maintained at the desired clearance above the ground while simultaneously avoiding obstacles existing in the flight path.

Referring once again to the elevational scan profile of FIGURE 1, the hatched area 20 represents the climb sector defined by the templet pulse. If the echo pulse occurs before the templet pulse, then the object is located within the climb templet 20 and a climb command is generated, displayed on an indicator, and sent to the autopilot to program a climb for the aircraft. When the echo pulse occurs after the templet pulse, the object lies outside the climb sector 20. Then if no object was located within the climb sector 20 during the scan, a dive command is generated, displayed on an indicator, and sent to the autopilot to program a dive for the aircraft. If no return signals are present, a signal is generated indicating a possible malfunction and an abrupt climb command is generated.

In FIGURE 2, the hatched area 22 represents the fly left zone of the azimuth templet, and hatched area 24 represents the fly right zone of the azimuth templet. If a return echo occurs before the templet pulse while scanning in the fly left sector 22, a fly left command is generated, displayed on an indicator, and sent to the autopilot to program a fly left maneuver. In the event an object is located in the fly right sector 24, an appropriate fly right command will be displayed and sent to the autopilot. Should obstacles occur in both the fly left and the fly right sectors 22 and 24, a turn command will be generated that is proportional to the relative positions of the obstacles so that the aircraft will tend to fly between the obstacles. Then reliance is placed upon the vertical scan function to insure that the aircraft clears any obstacles that lie in its path by increasing the altitude of the aircraft. In the event no obstacles are located in either the fly left or fly right sectors 22 or 24, then no turn command is generated. If desired, the turn command signals can be overridden by a course command signal which increases in magnitude as the aircraft digresses further from a preselected course.

Referring now to FIGURE 3, a radar system constructed in accordance with the present invention is indicated generally by the reference numeral 30. The system 30 may include any conventional forward looking radar system, although a monopulse resolution radar (MRI), such as that represented by the portion of the block diagram within the dotted outline 32, is preferred. Such a system consists of a transmitter synchronizer 34 for generating the system timing signal and thereby establishing the pulse repetition frequency (PRF). The synchronizing pulses are used to cause the transmitter modulator 36 to initiate the emission of the radar pulses which are fed through a four port circulator 38, or other suitable isolating device, and an E-plane magic tee 40 to the antenna 42. The isolating device 38 is used to prevent the transmitted pulse from being sent to the receiver. The pulsing of the transmitter modulator 36 causes a radar carrier signal pulse to be transmitted from the antenna 42.

The electromagnetic energy radiated from the antenna 42 travels through space until striking an object, such as the terrain or an obstacle above the terrain. The object then causes a reflected pulse of the carrier to be received by the antenna 42. The E-plane magic tee 40 provides a sum output and a difference output on channels 44 and 46, respectively. The sum output is applied through the four port circulator 38 to a sum receiver 48, and the difference signal is supplied to the difference receiver 50. The sum receiver produces a sum IF signal which is applied by channel 52 to a phase detector 54 and the difference receiver produces a difference IF signal which is also applied to the phase detector 54 by channel 56. The video output of the sum receiver 48 is applied by way of channel 58 to a bore sight detector 60, which is a subtractor unit. The output of the phase detector 54 is applied to the bore sight detector 60. At the same time the trigger pulse is sent from the transmitter synchronizer 34 to the transmitter modulator 36, the pulse is also applied by way of a blanking pulse generator 62 to the bore sight detector 60. As a result of the conventional system thus far disclosed, a high resolution pulse representative of the first echo returning to the antenna for each transmitted pulse is produced at the output 64 of the bore sight detector 60.

An antenna scan programmer 66 supplies antenna positioning signals to an azimuth servo control 68 and to an elevation servo control 70. Azimuth servo control 68 drives the azimuth motor 72, which is coupled to the antenna 42 through linkage represented by the dotted line 74. The elevation servo control 70 drives elevation motor 76, which is coupled to the antenna 42 by linkage represented by dotted line 78. An azimuth position sensor 80 is coupled to the antenna 42 through linkage represented by dotted line 82, and provides data concerning the azimuth position of the antenna which is applied to an azimuth command generator 84. An elevation position sensor 86 is coupled to the antenna 42 through linkage represented by dotted line 88, and generates elevation position data which is applied to an elevation command generator 90. The scan programmer 66 applies an elevation gate pulse to gate 92 through channel 94, and an azimuth gate pulse to gate 96 through channel 98. The gate pulses are timed so that during the vertical scan the video signal from the output 64 will be gated to the elevation command generator 90, and during the horizontal or azimuth scan will be gated to the azimuth command generator 84. The synchronizing trigger pulses (PMT) are applied to the elevation command generator by channel 100 and the azimuth command generator by channel 128.

The elevation command generator 90 may be of conventional design and produces either a climb or dive command under the conditions heretofore described. The output from the elevation command generator 90 is applied to a greatest climb selector 102. An altimeter 104 supplies altitude information to an altitude comparison circuit 106. Terrain clearance information is provided from the set clearance information circuit 108 to the altitude comparison circuit 106. The output of the altitude comparison circuit is an elevation command representing the difference between a desired altitude provided by the set clearance information and the measured altitude. This command, commonly called altitude override, is applied to the greatest climb selector circuit 102 which chooses between the commands from the altitude comparison circuit and the elevation command generator, selecting the one which represents the greatest climb command. This climb command is applied to the climb-dive indicator 110 and also to the autopilot 112 where automatic control of the aircraft is desired.

During the azimuth portion of the antenna scan pattern, the scan gating pulse from the programmer 66 applied to gate 96 allows the MRI video signal on the output 64 to be applied to the azimuth command generator 84. The azimuth command generator 84 is shown in greater detail in FIGURE 4. The azimuth position information is provided from the azimuth position sensor 80 by way of channel 120 to an azimuth position amplifier and demodulator 122. The demodulated azimuth position information is sent to ramp generator 124 and via a templet front face modulator 126 to a second ramp generator 132. The front face modulator modulates the position and/or shape of the front of the azimuth scan templet as a function of some aircraft flight characteristics or dynamics.

The synchronizing trigger pulses (PMT) are applied through channel 128 to the templet gate generator 130, which is essentially a multivibrator which produces a gate pulse until reset by a pulse from OR gate 138. The gate pulses from templet gate generator 130 are applied to ramp generators 124 and 132. Ramp generator 124 generates a ramp voltage in response to the gate pulse the slope of which is a function of the azimuth position information signal from the azimuth position amplifier and demodulator 122. In a like manner, ramp generator 132 generates a ramp voltage the slope of which is a function of the azimuth position information produced by azimuth position amplifier and demodulator 122 as modified by the templet front faced modulator 126. The ramp voltage from ramp generator 124 is applied to a first comparator 134, and the ramp voltage from ramp generator 132 is applied to a second comparator 136. When the ramp voltage from ramp generator 124 reaches the reference level of comparator 134, a pulse is generated which is applied to the OR gate 138. In a like manner, when the ramp voltage applied to comparator 136 reaches the reference level in the comparator, a pulse is generated which is applied to the OR gate 138. Only one of the comparators 134 or 136 will normally generate the pulse to be sent to the OR gate 138, because the edge 24a of the templet (see FIGURE 2) is defined by ramp generator 124 and edge 24b is defined by ramp generator 132. However, the comparators may generate pulses simultaneously when the antenna is pointing at the junction between sides 24a and 24b, for example. The output of OR gate 138 is returned to the templet gate generator 130 to cause the templet gate generator to be reset to its stable state. At that instant, ramp generators 124 and 132 terminate the ramp voltages in response to the termination of the gate signals from the templet gate generator 130 so that the circuits will be ready to receive the next PMT pulse.

The MRI video signal from output 64, which is the echo pulse resulting from the previous PMT pulse, is applied by way of channel 140 to a threshold circuit 142 during the azimuth portion of the antenna scan pattern as the result of gate 96. The threshold circuit 142 produces an output only if the amplitude of the MRI video signal exceeds the threshold set in the threshold circuit 142. If the MRI video signal exceeds the threshold level, an output signal is applied to an MRI monostable multivibrator 144. The monostable multivibrator 144 generates a gate signal which is representative of a target return and which is applied to an AND circuit 146. The other input to the AND circuit 146 is supplied by the templet gate generator 130 which produces a gate signal in response to the PMT pulse that continues until the reset signal from OR gate 138 which defines the templet boundary. Thus, the AND circuit 146 produces an output so long as both the signal from the templet gate generator 130 and the signal from the monostable multivibrator 144 are coincident. Thus, AND circuit 146 produces a pulse the width of which is directly related to the penetration of the object into the templet and is defined by the time of coincidence of pulses from monostable multivibrator 144 and templet gate generator 130. In the event an obstacle appears outside the azimuth templet, such as the peak 148 in FIGURE 2, the templet gate will have terminated (the templet boundary having been reached) before the pulse from the MRI monostable circuit 144 representative of peak 148 appears at the gate 146, and in this case there will be no coincidence between the two signals applied to gate 146 and no output pulse from AND gate 146 will be produced. When an obstruction appears within the templet, such as the peak 150 in FIGURE 2, the MRI monostable 144 will generate a gate pulse before the termination of the gate pulse from templet gate generator 130, and the AND gate 146 will produce a pulse during the coincidence of the two pulses applied to the gate.

The pulse passed through the AND gate 146 is applied to a ramp generator 152 which generates a ramp voltage which is applied to gates 156 and 158. The end of scan generator 160 shown in FIGURE 3 produces a gating signal on channel 162 during the period of time that the antenna scans from the left hand limit 18a to the flight vector 16 and a gate signal on channel 164 while the antenna scans from the flight vector 16 to the right hand azimuth scan limit 18b. Thus, during the left hand scan, the ramp voltage from the ramp generator 152 is applied by gate 156 to the left peak detector 166, and during the right hand scan is applied by gate 158 to the right peak detector 168. Each of the ramp voltages from the ramp generator 152 has a duration determined by the duration of the signal from the AND gate 146 (the duration of said AND gate signal being related to the position of the obstacle within the templet), and therefore the peak value of the ramp voltages is accordingly related to the position of the obstacle within the left hand or right hand sector of the azimuth templet (depending whether gate 156 or 158 is open). The peak values are stored in the peak detectors. In this manner, information concerning obstructions are stored on the right or left peak detectors 168 and 166 depending upon which side of the flight vector 16 the obstructions occur. The outputs from the peak detectors 166 and 168 are applied to a command amplifier 170, which may be a differential amplifier, which produces a left-right command signal weighted in proportion to the relative values of the peak voltages stored on the detectors 166 and 168, and therefore related in value to the relative positions of the nearest objects, if any, in the fly left and fly right sectors of the azimuth templet.

The left-right command signal from the amplifier 170 may be applied directly via conductor 171 to a left-right indicator 172 and to the autopilot 112 shown in FIGURE 3, but is preferably applied to a greatest deviation selector 174. Turn commands from a navigation system 176 may also be applied to the greatest deviation selector 174. The greatest deviation selector 174 compares the turn command signals from the azimuth command generator 84 and the turn command signals from the navigation system 176 and prevents the generation of a left turn signal, for example, when the aircraft has strayed from a selected course by an amount greater than a selected maximum. The output from the greatest deviation selector 174 is applied to the autopilot 112. As a result, the aircraft will avoid obstacles by turning left or right until such time as the aircraft is a maximum distance from course, at which time a turn command from the azimuth command generator 84 in a direction away from the course will be overridden by the command from the navigation system, and the terrain will then be avoided by climbing.

Although a preferred embodiment of the invention has been described in detail, it is to be understood that various changes, substitutions and alterations can be made therein without departing from the spirit and scope of the invention as defined by the appended claims.

What is claimed is:

1. In an airborne, forward-looking radar, the combination of:
    (a) means for scanning RF pulses alternately through a vertical scan cycle and a horizontal scan cycle and producing a video signal representative of the first RF return,
    (b) means for generating scan position information representative of the position of the scan,
    (c) means for processing the video signal and the scan position information during the vertical scan cycle to generate a climb-dive command signal indicating the maneuver necessary to maintain the aircraft at a predetermined height above the terrain, and
    (d) means for processing the video signal and the scan position information during the horizontal scan cycle to generate a left-right turn command indicating the maneuver necessary for the aircraft to avoid obstacles within a predetermined distance of the flight vector.

2. In an airborne, forward-looking radar, the combination of:
    (a) means for generating a series of RF pulses.
    (b) antenna means for scanning the RF pulses in advance of the aircraft alternately in a vertical plane over a scan angle extending above and below the flight vector of the aircraft and in a horizontal plane over an angle extending to each side of the flight vector,
    (c) means for receiving RF energy reflected from objects within the scan to the antenna and producing a video signal representative of the first returning energy, (d) means for generating a vertical scan signal representative of the scan position of the RF pulses in the vertical plane, (e) means for generating a horizontal scan signal representative of the scan position of the RF pulses in the horizontal plane, (f) means for generating a climb-dive signal from the relationship of the video signal to the RF pulse and the vertical scan signal indicating the movement necessary for the aircraft to maintain a predetermined height above the ground, (g) means for generating a left-right turn signal from the relationship of the video signal to the RF pulse and the horizontal scan signal indicating the maneuver necessary for the aircraft to avoid obstacles within a predetermined distance of the flight vector, and (h) means for gating the video signal to the means for generating a climb-dive signal during the period the RF energy is scanned in the vertical plane and for gating the video signal to the means for generating the left-right turn signal during the period the RF energy is scanned in the horizontal plane.

3. The combination defined in claim 2 wherein the means for generating the left-right turn signal comprises:
(a) means for producing a ramp voltage for each RF pulse the peak value of which is a function of the distance an object reflecting an RF pulse has penetrated a predetermined scan templet,
(b) first storage means for storing the peak value of the ramp voltages occurring during the horizontal scan to the left of the flight vector,
(c) second storage means for storing the peak value of the ramp voltages occurring during the horizontal scan to the right of the flight vector, and
(d) means for comparing the peak values stored by the first and second storage means and generating the left-right turn command based upon the comparison.

4. The combination defined in claim 3 wherein the means for producing the ramp voltage for each RF pulse comprises:
(a) means for producing a first pulse which starts in response to the transmission of the RF pulse and is terminated after a predetermined time period representing the scan templet,
(b) means for indicating a second pulse upon the occurrence of the video signal, and
(c) means for initiating the ramp voltage of predetermined slope in response to the occurrence of both the first and second pulses and terminating the ramp voltage upon termination of the first pulse.

5. The combination defined in claim 4 wherein the means for producing the first pulse comprises:
(a) means for producing a ramp voltage starting with the transmission of the RF pulse having a slope determined by the position of the scan such that the ramp voltage reaches a predetermined value at a time representing the boundary of the scan templet at the particular scan angle, and (b) means for initiating the first pulse in substantial synchronism with the transmission of the RF pulse and terminating the first pulse when the ramp voltage reaches the predetermined value.

6. In an airborne radar system for scanning an RF pulse beam alternating through a vertical scan cycle extending above and below the flight vector of the aircraft and through a horizontal scan cycle extending left and right of the flight vector and producing a video signal representative for the first RF echo received and scan position information, a system for generating a left-right turn command comprising the combination of:
(a) means for producing a ramp voltage for each RF pulse the peak value of which is a function of the distance an object reflecting an RF pulse has penetrated a predetermined scan templet,
(b) first storage means for storing the peak value of the ramp voltages occurring during the horizontal scan to the left of the flight vector,
(c) second storage means for storing the peak value of the ramp voltages occurring during the horizontal scan to the right of the flight vector, and
(d) means for comparing the peak values stored by the first and second storage means and generating the left-right turn command based upon the comparison.

7. The combination defined in claim 6 wherein the means for producing the ramp voltage for each RF pulse comprises:
(a) means for producing a first pulse which starts in response to the transmission of the RF pulse and is terminated after a predetermined time period representing the scan templet,
(b) means for indicating a second pulse upon the occurrence of the video signal, and
(c) means for initiating the ramp voltage of predetermined slope in response to the occurrence of both the first and second pulses and terminating the ramp voltage upon termination of the first pulse.

8. The combination defined in claim 7 wherein the means for producing the first pulse comprises:
(a) means for producing a ramp voltage starting with the transmission of the RF pulse having a slope determined by the position of the scan such that the ramp voltage reaches a predetermined value at a time representing the boundary of the scan templet at the particular scan angle, and
(b) means for initiating the first pulse in substantial synchronism with the transmission of the RF pulse and terminating the first pulse when the ramp voltage reaches the predetermined value.

References Cited

UNITED STATES PATENTS

| | | | |
|---|---|---|---|
| 3,243,802 | 3/1966 | Carver | 343—7 |
| 3,302,198 | 1/1967 | Selvin et al. | 343—7 |

RODNEY D. BENNETT, *Primary Examiner.*

T. H. TUBBESING, *Assistant Examiner.*